US012028667B2

(12) United States Patent
Robateau

(10) Patent No.: US 12,028,667 B2
(45) Date of Patent: Jul. 2, 2024

(54) SYSTEM AND METHOD FOR INTERACTIVE MICROPHONE

(71) Applicant: Deandre Robateau, Chicago, IL (US)

(72) Inventor: Deandre Robateau, Chicago, IL (US)

( * ) Notice: Subject to any disclaimer, the term of this patent is extended or adjusted under 35 U.S.C. 154(b) by 9 days.

(21) Appl. No.: 17/148,683

(22) Filed: Jan. 14, 2021

(65) Prior Publication Data

US 2021/0219039 A1 Jul. 15, 2021

Related U.S. Application Data

(60) Provisional application No. 62/960,764, filed on Jan. 14, 2020.

(51) Int. Cl.
*H04R 1/08* (2006.01)
*G10H 1/36* (2006.01)

(52) U.S. Cl.
CPC ............ *H04R 1/083* (2013.01); *G10H 1/361* (2013.01); *G10H 2220/211* (2013.01)

(58) Field of Classification Search
CPC ...... H04R 1/083; H04R 1/04; H04R 2420/07; G10H 1/361; G10H 1/365; G10H 1/368; G10H 2220/211; G10H 2220/011
See application file for complete search history.

(56) References Cited

U.S. PATENT DOCUMENTS

| | | | | |
|---|---|---|---|---|
| 6,520,776 | B1 | 2/2003 | Furukawa | |
| 8,380,119 | B2 | 2/2013 | Rubio et al. | |
| 2016/0103511 | A1* | 4/2016 | Hardi | H04L 65/75 345/173 |
| 2019/0147841 | A1* | 5/2019 | Zatepyakin | G10H 1/365 352/12 |

FOREIGN PATENT DOCUMENTS

| | | | |
|---|---|---|---|
| CN | 206117984 | U | 4/2017 |
| CN | 107820157 | A | 3/2018 |

OTHER PUBLICATIONS

Huxspoo (Wireless Bluetooth Karaoke Microphone) https://www.amazon.com/Wireless-Bluetooth-Microphone-Rechargeable-Professional/dp/B088FVD9BK?th=1 https://manuals.plus/karaoke/ws-858-wireless-karaoke-microphone-manual#google_vignette (Year: 2020).*

Bluetooth Karaoke Microphone: Wireless Handheld Machine for Kids with Speaker Player System, Amazon.com, https://www.amazon.com/Bluetooth-Karaoke-Microphone-Multipurpose-Professional/dp/B073HF15ZYpsc=1&SubscriptionId=AKIAI7OBN4VGEBVPCSMQ&tag=elecran-20&linkCode=xm2&camp=2025&creative=165953&creativeASIN=B073HF15ZY [Date accessed: Apr. 12, 2019].

* cited by examiner

*Primary Examiner* — Yogeshkumar Patel

(74) *Attorney, Agent, or Firm* — Crowell & Moring LLP; John C. Freeman

(57) ABSTRACT

A system and method for an interactive three piece microphone with customizable features that may be quickly accessed by a user whereby the users' settings are automatically uploaded to the microphone providing a more personalized experience. The microphone may be used in a variety of situations where users may challenge one another as well as collect monetary rewards based on the location and type of performance they have.

19 Claims, 7 Drawing Sheets

SYSTEM AND METHOD FOR INTERACTIVE MICROPHONE

CROSS-REFERENCE TO RELATED APPLICATIONS

This application claims priority to U.S. Provisional Application 62/960,764 filed on Jan. 14, 2020. The content of the above application is hereby expressly incorporated by reference herein in its entirety.

FIELD OF DISCLOSURE

The overall field of this invention is a system and method for an interactive microphone. More particularly, the invention relates to a three piece customizable microphone that may access separate profiles for each user based on touch whereby the microphone provides many interactive features to the user based on scoring functions of the user meeting various criteria with the microphone.

BACKGROUND

Video games have evolved to take advantage of the nearly instantaneous global communications provided by the Internet in order to provide rich multiplayer online gaming experiences where players from all over the world compete and/or interact with one another. Many popular games also utilize karaoke, such as performing or singing lyrics during the music, while adding a variety of game functions using the music performance of the user of the karaoke apparatus. However, these microphones do not perform as well as traditional microphones and require an output device to play the music. There is also not a personalized musical experience that allows players to participate by singing songs, challenging one another, acting as judges and/or acting as audience members while also being able to collect monetary and other rewards based on the location they are performing.

SUMMARY

It is an object of the present description to provide an interactive system, comprising a computing device, one or more processors, one or more memory devices coupled to the one or more processors, and one or more computerized programs, whereby the one or more computerized programs are stored in the one or more memory devices and configured to be executed by the one or more processors, the one or more processors configured to: receive input from the computing device, the one or more processors further configured to: determine, from one or more sensors on the computing device, a duration that the computing device is being held by a user or a button or screen on the computing device is being held by the user, and determine a reward or prize based on the duration, determine from GPS of the computing device if the computing device is within a predetermined distance from a physical location wherein the reward or prize is given if the computing device is held or the button or the screen is held by the user until reaching the predetermined distance from the physical location, wherein the computing device is a microphone device, the microphone device comprising a handle, a body attached to the handle, and a head attached to the body, the microphone device having a speaker and a microphone.

It is an object of the present description to provide an interactive system, comprising a computing device, one or more processors, one or more memory devices coupled to the one or more processors, and one or more computerized programs, whereby the one or more computerized programs are stored in the one or more memory devices and configured to be executed by the one or more processors, the one or more processors configured to: receive input from the computing device, the one or more processors further configured to determine if the computing device is within a predetermined distance of a physical location, receive audio and video transmitted from the computing device from the speaker and the microphone by a first user during a performance, present audio and video from the first user to one or more second computing devices of one or more second users, transmit payment to an account of the first user for transmitting the audio and video from the computing device, receive one or more tokens for a predetermined block of time or an amount of the performance from the first user on the computing device, receive audio and video transmitted from the one or more second computing devices of the performance of the first user, present audio and video of the performance of the first user received by the computing device and the one or more second computing devices to the one or more second computing devices to offer additional viewing selections for the performance of the first user, connect a first user and one or more second users by a validation of the computing device and one or more second computing devices by detecting a change in acceleration or an impact by sensor signal processing of the computing device and the one or more second computing devices at a same time and a same location, evaluate during a challenge pitch difference or error of received audio interpretation of a selected song through the microphone of the computing device and a microphone of the one or more second computing devices in comparison to stored audio of the song on one or more databases, wherein the error is configured to be scaled based on a difficulty selected by the first user and the one or more second users, presenting to the first user scores as judged by the one or more second users who have been presented received audio interpretation of the selected song from the first user, the one or more second users acting as judges or audience members, transmit background music of a selected song through a speaker on the computing device, displaying lyrics from the selected song from a hologram on the computing device, wherein the computing device has a vibration motor installed wherein the vibration motor vibrates in response to the pitch difference or error, further comprising smart eyeglasses configured to display virtual objects associated with a challenge and lyrics of a selected song, associate the physical location as a hot zone, presenting a graphical indication of the hot zone on a user interface of one or more second computing devices, wherein the hot zone is displayed at different sizes to indicate the total number of the computing device and the one or more second computing devices currently located at the hot zone, presenting to a first user through the user interface the one or more second computing devices and their respective one or more second users that are located at the hot zone, setting privacy parameters for the first user so that the first user's presence at the hot zone is only visible with a predefined group of users of the one or more second users, verify that the computing device and one or more additional computing devices associated with the first user are within a certain proximity of each other as well at the physical location.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
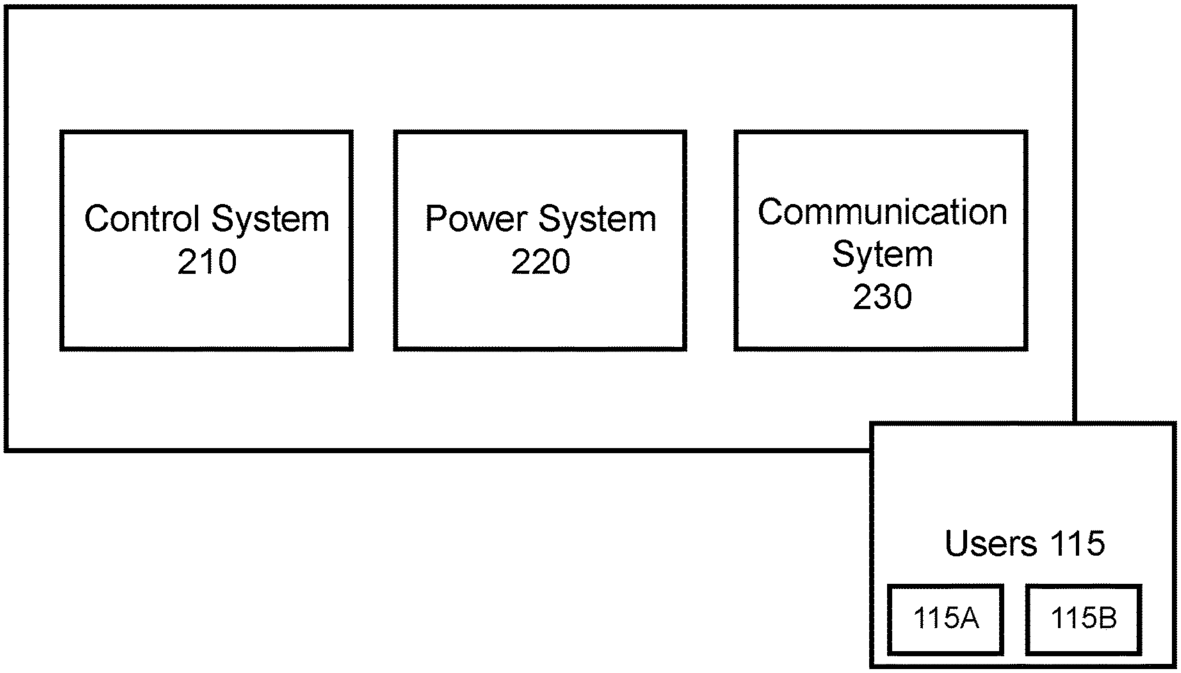
FIG. 1 shows a block diagram of the various systems of the microphone of an exemplary interactive microphone system.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for an interactive three piece microphone with customizable features that may be quickly accessed by a user whereby the users' settings are automatically uploaded to the microphone providing a more personalized experience. The microphone may be used in a variety of situations where users may challenge one another as well as collect monetary rewards based on the location and type of performance they have.

Turning to FIG. 1, FIG. 1 depicts a block diagram of an embodiment of the present invention for an interactive microphone system 100. Interactive microphone system 100 may include a plurality of microphones such as microphone 110. Microphone 110 may be utilized by a series of users such as users 115, including user 115*a* and 115*b*. Further, microphones 110 and users 115 may be located in various geographical locations that are either located apart or are located in proximity to each other.

Microphones 110 may have a plurality of systems including a control system such as control system 210, a power system such as power system 220, and a communication system such as communication system 230, which may be integrated in combination within the structure of microphone 110. The various systems may be individually configured and correlated with respect to each other so as to attain the desired objective of providing an interactive microphone 110 for users 115*a* and 115*b*.

Power system 220 of microphone 110 may provide the energy to microphone 110 including the circuits and components of control system 210 during operation of microphone 110. Microphone 110 may be powered by methods known by those of ordinary skill in the art. In some embodiments, microphone 110 may plug into an electrical outlet using an electrical cord to supply power to microphone 110 and the circuits and components of control system 210. Further, power system 220 may include a rechargeable battery pack whereby the rechargeable battery is of a charge, design, and capacity, to provide sufficient power to microphone 110 and the circuits and components of control system 210 while running microphone 110 for a set period of time.

Control system 210 may operate to control the actuation of the other systems. Control system 210 may have a series of user computing devices which will be discussed in detail later in the description. Control system 210 may be in the form of a circuit board, a memory or other non-transient storage medium in which computer-readable coded instructions are stored, and one or more processors configured to execute the instructions stored in the memory. Control system 210 may have a wireless transmitter, a wireless receiver, and a related computer process executing on the processors.

User computing devices of control system 210 may be any type of user computing device that typically operates under the control of one or more operating systems which control scheduling of tasks and access to system resources. User computing devices 210 may be a phone, tablet, television, desktop computer, laptop computer, gaming system, wearable device electronic glasses, networked router, networked switch, networked, bridge, or any user computing device capable of executing instructions with sufficient processor power and memory capacity to perform operations of control system 110.

The one or more user computing devices may be integrated directly into control system 210, while in other non-limiting embodiments, control system 210 may be a remotely located user computing device or server configured to communicate with one or more other control systems 210 in microphones 110. Control system 210 may also include an internet connection, network connection, and/or other wired or wireless means of communication (e.g., LAN, etc.) to interact with other components. These connections allow users 115_a_ and 115_b_ to update, control, send/retrieve information, monitor, or otherwise interact passively or actively with control system 210.

Control system 210 may include control circuitry and one or more microprocessors or controllers acting as a servo control mechanism capable of receiving input from various components of microphone 110 as well communication system 230, analyzing the input from the components and communication system 230, and generating an output signal to the various components and communication system 230. The microprocessors (not shown) may have on-board memory to control the power that is applied to the various components, power system 220, and communication system 230, in response to input signals from the users 115_a_ and 115_b_ and the various components of microphone.

Control system 210 may maintain one or more databases including a library of digitized auditory signals including songs for play on the microphone through the speaker, whereby the library may be changed or updated through communication by server 300. The one or more databases may also include a song file parser to read MIDI note data, pre-recorded sound data, and any additional metadata or annotations added to song files. Control system 210 may also receive and store data constituting images (e.g., still and/or moving video and/or graphical images) that may be displayed on the projector of microphone 110.

Microphone 110 may include local wireless circuitry, which would enable short-range communication to another user computing device as well as Bluetooth sensors and NFC chips. The local wireless circuitry may communicate on any wireless protocol, such as infrared, Bluetooth, IEEE 802.11, or other local wireless communication protocol.

Microphone 110 may have one or more communication ports coupled to the circuitry to enable a wired communication link to another device, such as but not limited to another wireless communications device including a laptop or desktop computer, television, video console, speaker, smart speaker, or voice assistant such as Alexa Echo®. The communication link may enable communication between Microphone 110 and other devices by way of any wired communication protocol, such as USB wired protocol, RS-232, or some proprietary protocol. Microphone 110 may have a global positioning system (GPS) unit coupled to the circuitry to provide location information to the circuitry whereby the GPS may provide the location information related to the location of microphone 110 as known by those of ordinary skill in the art.

Microphone 110 may communicate with other devices via communication links, such as USB (Universal Serial Bus) or HDMI/VGA (High-Definition Multimedia Interface/Video Graphics Array). Microphone 110 may include voice recognition capable software that may be used to navigate or issue instructions as well as fingerprint recognition software, optical scanners, optical pointers, digital image capture devices, and associated interpretation software. Microphone 110 may utilize additional Input Devices 265 and Other I/O 275 in the form of examples such as a speaker, smart speaker, microphone, headphone jack, indicator lights, and vibrational motor.

Figure 2:
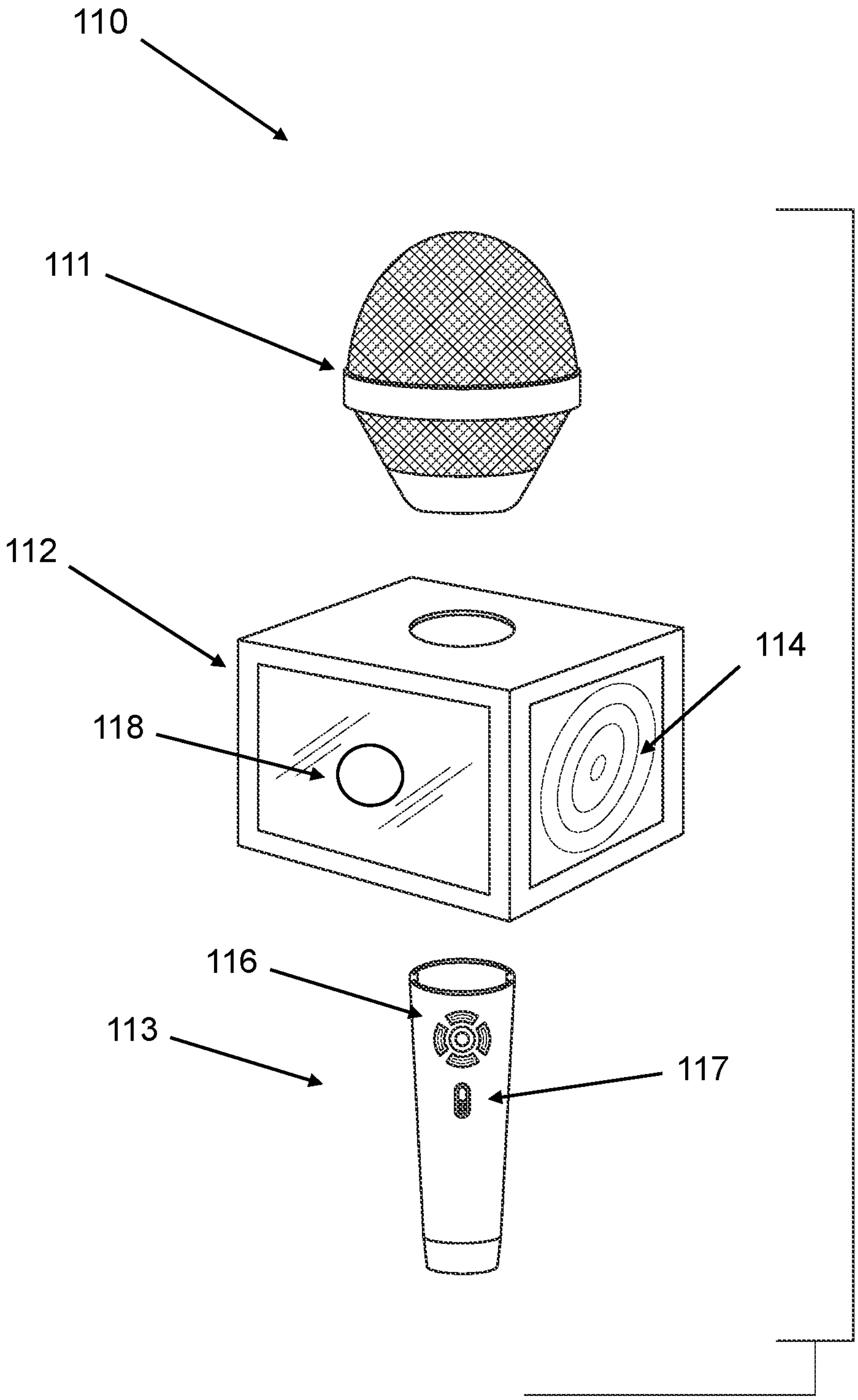
FIG. 2 shows an illustration of the exemplary microphone of an interactive microphone system.

In some embodiments, microphone 110 may have three interchangeable removable pieces as illustrated in FIG. 2, such as a microphone head 111, main body 112, and a handle 113 whereby the three components are connected by Bluetooth or any type of local connection such that they may interact with each other when detached or connected. This configuration allows microphone 110 to be highly customizable and utilize many different interchangeable shapes, colors, and sizes depending on the personality and specific preferences of users 115. Main body 112 of microphone 110 may be in the shape of a cube, pyramid, sphere, circle, or any other shape suitable for the intended purpose of the present invention. Also, variations of main body 112 may be designed after faces, buildings, sports balls, stages, or different venues. Microphone head 111 may be replaced or otherwise interchanged with a camera, video capturing device, or projecting device whereby once a new microphone head 111 has been placed on the main body 112, a series of sensors may detect the newly positioned head, sending the signal to control system 210 whereby control system 210 detects and allows functionality in correspondence to the newly positioned head.

Microphone 110 may be connected or attached to any existing stand, grip, or pole in a similar manner to conventional microphones. Microphone 110 may have a pen holder built into the housing of microphone 110 whereby a stylus holder is a recess within the housing of the main body 112 of microphone 110 configured to hold a stylus. The stylus may have a touch screen interfacing element at the forward tip of the pen to interact with touchscreens whereby the forward tip may be inserted into the recess first. The touch screen interfacing element may be made of a conductive wire or other material configured to transmit an electrical signal necessary to register contact with a touch screen. The stylus holder may have a shaft which is retained inside the recess. The rear end of the stylus may have grip portion that is comprised of an angled toothed surface whereby to remove the stylus, users 115 may apply a pulling motion while holding the grip portion. The stylus is useful for those with writer's block and writing down lyrics or musical notes users 115 may come up with on a digital eBook reader or tablet. The stylus may also be used on the touch screen of user computing device or control panel 114 of microphone 110.

Microphone 110 may include one or more buttons such as buttons 116 along the exterior of microphone 110 including a power button such as power button 117 for exiting and/or deactivating microphone 110. Buttons 116 may be utilized as volume up and volume down buttons for increasing and decreasing the volume of the audio output from microphone, a home button and directional keys to navigate through one or more menus. These locations are merely for illustrative purposes and microphone 110 may feature a power control, volume control, and home control button, on the front, back, and/or side of any components of microphone 110. In some embodiments, the sides of microphone 110 may have no buttons.

Microphone 110 may include one or more control panels 114 that are touch panels on the front and a display behind the touch panel, such as for example a light emitting diode (LED) monitor, however this is non-limiting and control panel 114 may be a cathode ray tube (CRT) or a liquid crystal display (LCD). Control panels 114 may also have cover glass bonded to a top surface of a touch panel using adhesive or any other fastening methods known by those of ordinary skill in the art.

Control panels 114 may have capacitive sense capabilities, whereby when users 115 touch the touch panel, properties of the charged touch panel are altered in that spot, thus registering where control panel 114 was touched. Control panel 114 may also be receptive to a stylus made of a conductive wire or other material configured to transmit an electrical signal necessary to register the contact. Control panels 114 may have resistive sense capabilities whereby a touch panel may have two conductive layers layered inside the surface of control panel 114 whereby when users 115 press down on the touch panel, the two layers come in contact, completing a circuit and sending a signal of where control panel 114 was touched. The control panel 114 also include haptic feedback, for example, to inform user 115 of certain events. Haptic feedback may be provided through the entire touch screen display or may be local to a particular location on the touch screen display. Haptic feedback may be based on the location, shape, and orientation of the microphone.

Control system 210 may include circuitry to provide an actuable interface for user 160 to interact with, including switches and indicators and accompanying circuitry for an electronic control panel 114 or mechanical control panel. Such an actuable interface may present options to users 115 to select from such as, without limitation, volume from the speaker. Control system 210 may be preprogrammed with any reference values by any combination of hardwiring, software, or firmware to implement various operational modes.

Control panel 114 may be configured to receive touch-based input in a variety of forms similar to a mobile user computing device or other type of user computing device. For example, control system 210 may receive input from control panel 114 in the form of "gestures." Touch-based "gestures" can include, for example, swipe, tap, pinch, and many other known touch-based input motions. Each gesture may include, for example, a gesture type, a location, and for some gestures, a direction. Control system 210 may also receive raw input data, where some gestures comprise multiple raw input data points, each of which can include a location, input pressure, and other data. Each of the gestures noted above may be associated with respective input actions. For example, a swipe gesture may be used to scroll through one or more songs or to rotate to a specific part of the song. A tap gesture may be used to select songs or choose menu navigation selections. A pinch gesture may be used to change the size of a window or to zoom in and out on the lyrics. In some embodiments, users 115 may create, access, or otherwise associate with a custom gesture set to associate particular gestures with particular input actions.

In accordance with the concepts discussed, users 115 may insert a password to unlock microphone 110 via control panel 114 by entering various types of input or gestures corresponding to one or more commands, such as sliding their finger to make a design or diagram. Control system 210 analyzes and registers these inputs by users 115 and if the password matches the password chosen by users 115, microphone 110 unlocks access to the system and privileged information specific to a user 115.

Control panel 114 may have a series of actuable buttons that are presented such as a direction key used for menu navigation or moving through a list. In addition, the up and down keys may be presented to control the pitch while playing the song and left and right keys may be presented to adjust the speed. A stop key may be presented to go to the previous step or stop a song or cancel the menu to cancel the function. A play key may be presented to start the song or songs or select the item the cursor is on in the menu or a function.

Figure 3:
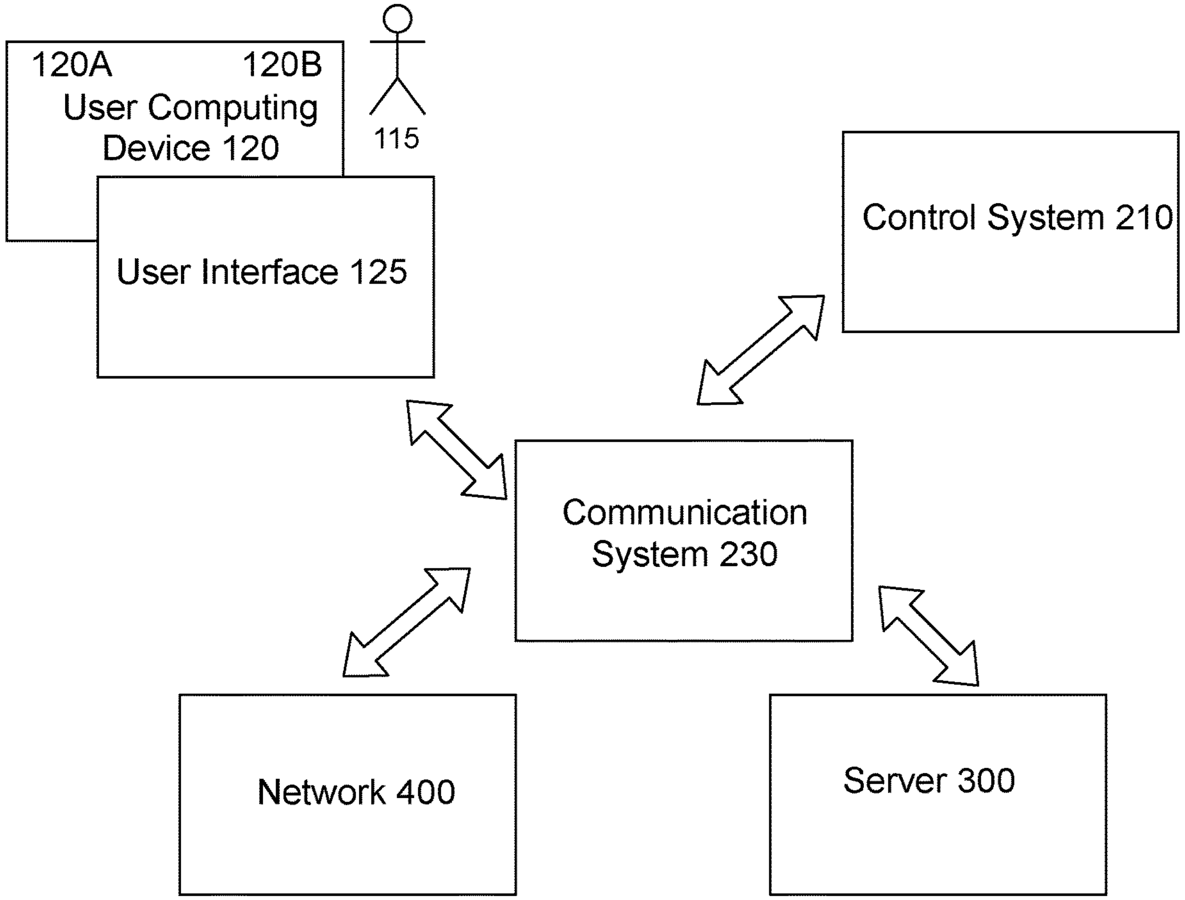
FIG. 3 shows an exemplary block diagram of a communication system of an interactive microphone system.

Control system 210 may be in communication with communication system 230, as illustrated in FIG. 3 to connect with other user computing devices whereby signals transmitted from the user computing devices may be received by control system 210. Communication system 230 may allow users 115 to interact with control system 210 using a user computing device such as user computing devices 120 including user computing device 120*a* and user computing device 120*b* even if users 115 are not proximate to control system 210. Users 115 may access a user interface, such as user interface 125 using user computing devices 120. User interface 125 may have a plurality of buttons or icons that are selectable by user 115 for communication system 230 to perform particular processes in response to the selections. User interface 125 may have conventional GUI interface devices such as a title bar, toolbars, pull-down menus, tabs, scroll bars, context help, dialog boxes, operating buttons (icons) and status bar that enable user navigation throughout the display.

In one or more non-limiting embodiments, communication system 230 may be innate, built into, or otherwise integrated into existing platforms or systems such as a website, a third party program, Apple™ operating systems (e.g. iOS), Android™, Snapchat™, Instagram™ Facebook™, or any other platform.

User computing device 120 of communication system 230 may be similar to the user computing devices of control system 210 and may be any type of user computing device that typically operates under the control of one or more operating systems which control scheduling of tasks and access to system resources. User computing device 120, may in some embodiments, be a user computing device such as an iPhone™, Android-based phone, or Windows-based phone, a tablet, television, desktop computer, laptop computer, gaming system, wearable device electronic glasses, networked router, networked switch, networked, bridge, or any user computing device capable of executing instructions with sufficient processor power and memory capacity to perform operations of Interactive Microphone System 100 while in communication with network 400. User computing device 120 may have location tracking capabilities such as Mobile Location Determination System (MLDS) or Global Positioning System (GPS) whereby they may include one or more satellite radios capable of determining the geographical location of user computing device 120.

In some embodiments, user computing devices 120 may be in communication with one or more servers, such as server 300 via communication system 230 or one or more networks such as network 400 connected to communication system 230. Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 may have a number of modules that provide various functions related to communication system 230. Modules may be in the form of software or computer programs that interact with the operating system of server 300 whereby data collected in databases as instruction-based expressions of components and/or processes under communication system 230 may be processed by one or more processors within server 300 or another component of communication system 230 as well as in conjunction with execution of one or more other computer programs. Modules may be configured to receive commands or requests from user computing devices 120, server 300, and outside connected devices over network 400. Server 300 may comprise components, subsystems and modules to support one or more management services for communication system 230.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital user computing devices (e.g. user computing device 120), such as GSM, GPRS, UMTS, AMPS, TDMA, or CDMA. In one or more non-limiting embodiments, different types of data may be transmitted via network 400 via different protocols. In alternative embodiments, user computing devices 120, may act as standalone devices or whereby they may operate as peer machines in a peer-to-peer (or distributed) network environment.

Network 400 may further include a system of terminals, gateways, and routers. Network may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between user computing devices if for instance they are in a remote location not accessible by other networks.

Figure 4:
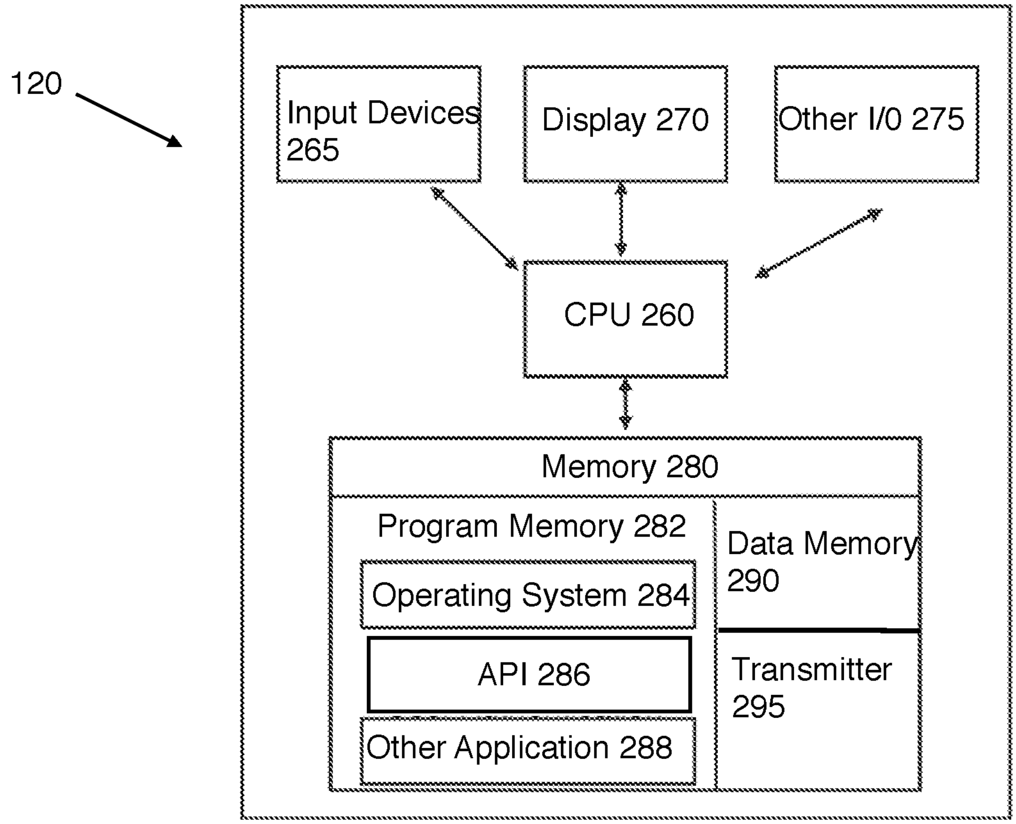
FIG. 4 shows an exemplary block diagram of various components of a computing device.

Turning to FIG. 4, FIG. 4 is a block diagram showing various components of user computing device 120. User computing device 120 may comprise a housing for containing one or more hardware components that allow access to edit and query communication system 230. User computing device 120 may include one or more input devices such as input devices 265 that provide input to a CPU (processor) such as CPU 260 of actions related to user 115. Input devices 265 may be implemented as a keyboard, a touchscreen, a mouse, via voice activation, wearable input device, a camera a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 120.

User computing device 120 may have a transmitter 295, such as transmitter 295, to transmit the biological data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

Microphone 110 may include a plurality of detectors mounted or otherwise connected to the housing of Microphone 110. Microphone 110 may have infrared ("IR") detectors having photodiode and related amplification and detection circuitry to sense the presence of people in the room or location or connected devices. In other embodiments, microphone 110 may include radio frequencies, magnetic fields, and ultrasonic sensors. Detectors may be arranged in any number of configurations and arrangements on the housing of microphone 110.

Microphone 110 may have a fingerprint sensor, whereby the fingerprint sensor may have optical, capacitive, light emitting sensors, or multispectral approaches. The fingerprint sensor may be fabricated upon a flexible substrate to allow for better optical coupling with the fingers of users 115*a* and 115*b*. In one or more non-limiting embodiments, the fingerprint sensor may be directly attached to the outer surface of microphone 110. Capacitive sensors may be used to analyze the full range of the finger or a swipe of the finger such that when the finger ridges make contact the capacitive sensor detects electrical currents with the finger ridges. Optical sensors may be used whereby a prism, light source, and light sensor capture images of fingerprints. In other non-limiting embodiments, Microphone 110 may use one or more sensors to identify vein patterns, and provide real-time measurements of heart rate, heart rate variability, blood flow, blood pressure, and any other biometrics. Microphone 110 may have one or more infrared (IR) sensors utilizing a high dynamic range to allow for more detailed image capturing of the biometric samples provided by user 115.

In some embodiments, other types of biometric data may accompany the fingerprint data such as a touch-based input or voice data for a verbal command. The fingerprint sensor may transmit the biometric data of users 115 to control system 210 whereby control system 210 may transmit the biometric data to server 300. Server 300 may then compare the biometric data to stored biometric data to confirm user identity, then determine the user type and associated permissions and privileges of that specific user 115.

Control system 210 may be configured to associate each received fingerprint input with a particular user 115 or user type from the set of user types whereby the customizable features, controls, and preferences of single user 115 will be presented or activated on microphone 110. Each user 115 or user type may be associated with one or more permissions selected from the stored permissions set stored on control system 210, user computing device 120, or server 300. Additional or alternate permissions may be stored and associated with users 115 as well. This allows users 115 of microphone 110 to not corrupt other records associated with users 115 as well as provides the ability to quickly and conveniently convert back and forth in case various users 115 are using a single microphone 110 such as when a family shares one microphone 110.

Microphone 110 may have a connected speaker assembly that converts an electrical signal from control system 210 into an audible sound. The speaker may be mounted to the housing of microphone 110 such that audible sound from the speaker has access to the exterior of the housing of microphone 110 where it then may be heard in the surrounding area. Control system 210 may be connected to a speaker assembly or audio receiving element allowing for the passage of sound to be received by control system 210 to receive auditory signals from users 115 or a third party in proximity to microphone 110. Control system 110 may also have the necessary circuitry to amplify and convert the signal of microphone to speaker and to convert the signal from microphone to control system 210 whereby auditory signals may be digitized and sent to databases or server 300 through communication system 230 whereby auditory signals may be compressed, encrypted, or arranged. Auditory signals may later be transmitted back to microphone 110 whereby auditory signals may be decompressed and decrypted by the microphone for storage and reproduction thereon.

Microphone 110 may have a recording button on the housing of microphone 110. The recording button may be depressed by users 115. After the recording button is depressed and then released, a signal may be sent to control system 210 whereby microphone 110 will record the audio in proximity to the audio receiver. The length of the recording may vary based on the size of the internal storage of microphone 110 or server 300. The recording button may then be depressed and then released once again whereby a signal is sent to control system 210 whereby microphone 110 will stop recording the audio.

In one or more non-limiting embodiments, control system 210 or server 300 may have one or more modules operable to perform and implement various types of functions, actions, and operations for interactive microphone system 100 whereby users 115 may sing a series of lyrics as well as insert a statement or ask a question and receive a response that is then presented to users 115. Modules may utilize a text to speech feature which generates a set of candidate text interpretations of an auditory signal such as the vocal commands from users 115 or lyrics sung by users 115. Modules may employ statistical language models to generate candidate text interpretations of auditory signals whereby lyrics may be generated for the songs sung by users 115 or a response may be generated based on the text interpretations of the auditory signals. For example, user 115*a* may state "remind me of a challenge with Bob at 4:00 PM" whereby modules may receive the input audio and in response provide an action whereby modules may transmit a notification pertaining to the challenge at 4:00 PM Microphone 110 may have a light source (e.g., a light emitting diode ("LED")) on the housing of microphone 110 such as along the perimeter of the fingerprint sensor. Power system 220 provides power to the light source. The light source may be connected to control system 210 whereby when control system 210 sends a signal to the light source, the light source may light up or flash colors when certain events occur, such as if users 115 have reached a desired location or are being challenged by another user 115 in a competitive match. In other embodiments, the speaker assembly may produce an audible sound when events such as these occur to notify and alert users 115.

Microphone 110 may have one or more primary cameras such as primary camera 118 on housing of microphone 110 whereby primary camera 118 may have one or more lenses, one or more sensors, a photosensitive device, and one or more LED flash lights whereby images and video may be captured. For example, camera 118 may capture pictures or video from a 360-degree field of view which may then be received by control system 210 and transmitted to communication system 230. Cameras 118 may utilize sensors such as a charged-coupled device (CCD) or Complementary Metal-Oxide Semiconductor (CMOS) to sense a captured scene. The sensors in the camera may capture light reflected from the scene taken and translate the strength of that light into a numeric reading by passing light through a number of different color filters whereby the readings are combined and evaluated via software to determine the specific color of each segment of the picture.

In some embodiments, microphone 110 may have a vibration motor installed in the main body 112 of microphone 110, whereby control system 210 controls the vibration motor such that microphone 110 vibrates in response to a rhythm of a song or an event. This allows users 115 to feel the songs they are singing and are more interactive such as by giving a start signal or assessing how well users 115 are singing.

Figure 5:
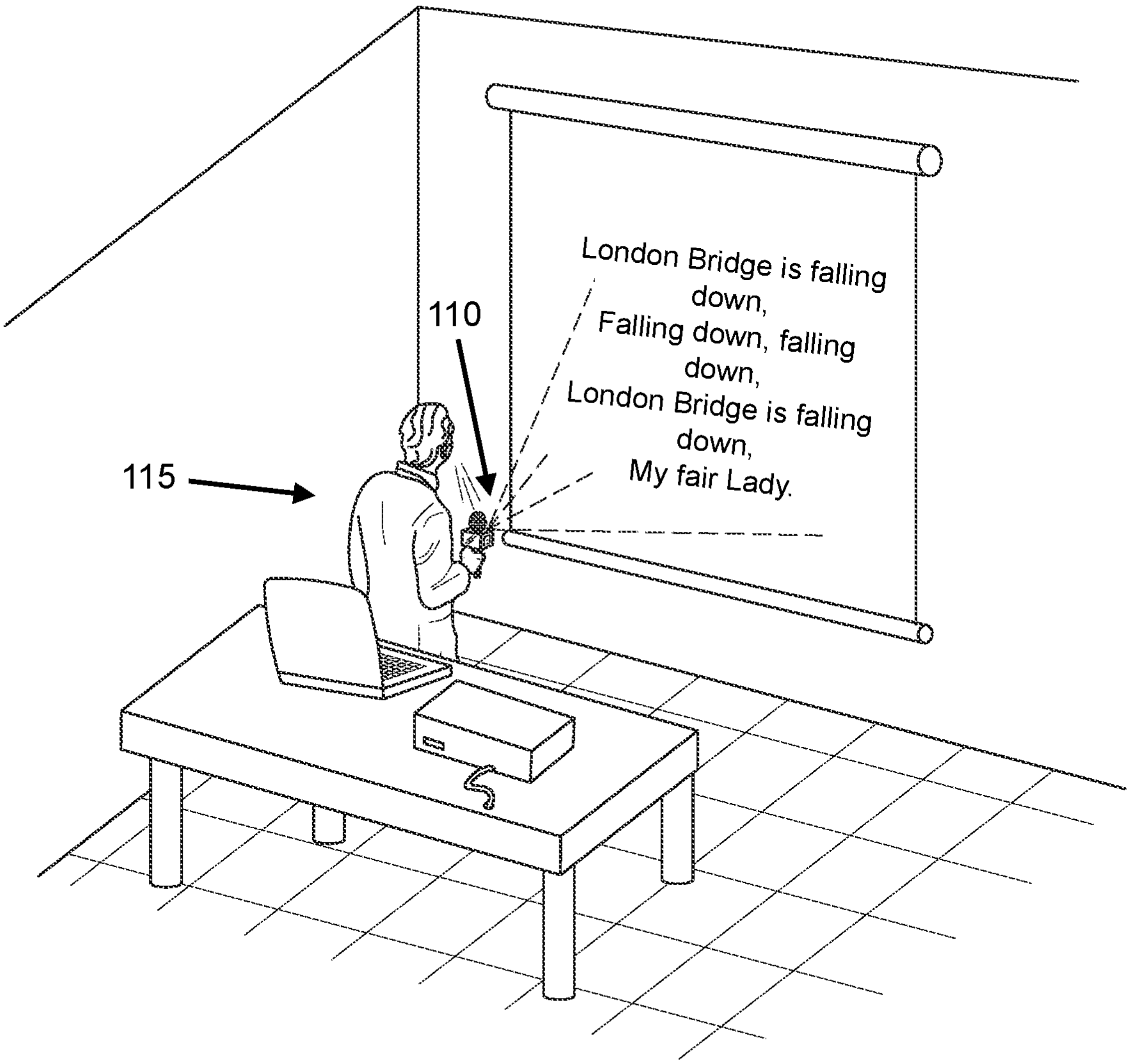
FIG. 5 shows an illustration of an exemplary holographic projector of the microphone.

As previously discussed, microphone 110 may have a built-in hologram projector whereby the images projected may be communicated from server 300 that are then visible to users 115 as illustrated in FIG. 5. The hologram projector may be built into handle 113 of microphone 110 while, in some embodiments, the hologram projector may be attached to handle 113 of microphone 110. The quality of display from the hologram may be based on the network connection type and strength whereby if the network strength is low, the quality of the projection may still be present but in a diminished quality. The orientation and arrangement of display may be altered based on settings of users 115 such as if they only have one eye where microphone 110 may project video at an angle visible for users 115.

The hologram projector may be a compact camera that converts the image or video display data provided from control system 210 to an image or video on a screen or other surface. Through the hologram projector, additional elements may be presented in coordination with the music, e.g., appear, pulsing, flashing, or changing color and/or shape with the beat of the music.

Through the hologram projector, users 115 may be presented with visual cues or game elements to indicate the sequence of upcoming notes in the songs they have selected.

Elements of the graphical display from the hologram projector may be optimized to fit particular song context, such as having all the cords color-coded so that the player may spot and sing that chord more efficiently. Other elements of the graphical display may be adjusted according to, for example, the nature of the song or the level of users 115 (e.g., color, brightness, presence or absence of visual elements indicative of mood and/or rhythm).

Through a hologram projector, the song experience may be further enhanced by additional visual cues such as lights, colors, patterns, or other graphic displays. In one non-limiting example, such displays may pulse, become larger or smaller, become brighter or dimmer, change shape, or otherwise change in appearance in a manner correlating with an aspect of a musical game such as rhythm, volume, or pitch. In some embodiments, such displays may correlate with the accuracy of a user's performance. In other embodiments, game-enhancing cues are audio in nature.

Through a hologram projector, one or more of the users 115 may be represented on screen by a virtual avatar. In some embodiments, an avatar may be a computer-generated image. In other embodiments, an avatar may be a digital image, such as a video capture of a person. An avatar may be modeled on a famous figure or, in some embodiments, the avatar may be modeled on users 115 associated with the avatar. In cases where additional players enter the game, the screen may be altered to display any other additional avatars.

In some embodiments, if a given number of bonuses are accumulated, a player may activate the bonus to trigger an in-game effect through the hologram projector. An in-game effect may include a graphical display, an increase or change in virtual crowd animation, avatar animation, performance of a special trick by the avatar, lighting change, or other signifier.

In some embodiments interactive microphone system 100 may include a wearable such as Google Glass™, or another form of wearable device that is connectable to a user computing device 120 or microphone 110. A wearable device may be in the form of eyeglasses positioned above the nose having one or more user computing devices. Such eyeglasses (not shown) may have a small video screen and camera that connect wirelessly to server 300, user computing device 120, and microphone 110. These eyeglasses may also receive pictures or video images, as well as lyrics or other users 115 streaming content.

Eyeglasses may be configured so that users 115*a* and 115*b* may interact with the augmented reality view by inserting annotations, comments, virtual objects, pictures, audio, and video, to locations within range of microphone 110 or user computing device 120. The virtual objects may include virtual characters or static virtual objects, and any other virtual objects that can be rendered by the augmented reality networking system built within interactive microphone system 100. These interactions may be viewed by other users 115*a* and 115*b* who may also build upon the interactions or make additional interactions that then may be seen by the original user or a third user.

In some embodiments, interactive microphone system 100 may include one or more gloves configured to receive haptic feedback data from users 115*a* and 115*b* to control components of interactive microphone system 100 such as the virtual avatars of users 115*a* and 115*b*. A glove may also be used by users 115*a* and 115*b* to interact in a collaborative way to navigate menus or screens and examine songs and lyrics. Users 115*a* and 115*b* may use their gloves to touch objects, move objects, interface with surfaces, press on objects, squeeze objects, toss objects, make gestures, actions, or motions, or the like.

A glove may have a series of pressure and motion sensors configured to generate sensor data such as to identify and track the finger positions and forces applied by a user to determine if contact is being made between the fingers. Sensor data may be received by one or more user computing devices on the glove or remotely be received by a control system of microphone 110 or a server, such as server 300, whereby sensor data is analyzed and the corresponding action or event is determined in response.

Users 115*a* and 115*b* may initially register to become a registered user 115 associated with Interactive Microphone System 100. Interactive Microphone System 100 may be downloadable and installable on user computing device 120. In one or more non-limiting embodiments, communication system 230 (e.g. as shown in FIG. 3) may be preinstalled on user computing devices 120 by the manufacturer or designer. Further, communication system 120 may be implemented using a web browser via a browser extension or plugin. Server 300 may associate user computing devices 120 with an account during the registration process.

When users 115*a* and 115*b* initially register to become a registered user of Interactive Microphone System 100, users 115*a* and 115*b* may be prompted to provide some personal information along with a requested account name and password, such as, without limitation, their name, age (e.g., birth date), gender, interests, contact information, home town, address, their visual capabilities such as only being able to see out of the left or right eye as well as other preferences. User preferences may also aid users 115*a* and 115*b* choosing defaults for common settings such as vocal levels, effects, settings when sharing, audio and video recordings, pitch, treble, bass, frequency range, favorites locations, and/or skills. Users 115 and 115*b* may also be provided with the ability to give priority to certain genres, determine the type of account associated with user 115*a* or 115*b* such as if it is subscription based or on a pay-per-play performance, and the type of user 115*a* and 115*b* and the rewards or monetary value they may obtain for each performance.

In some embodiments, when registering a user account, Interactive Microphone System 100 may allow users 115*a* and 115*b* to access and interact with Interactive Microphone System 100 using login credentials from other social networking platforms. For example, in some embodiments, it may be useful and convenient for users of Interactive Microphone System 100 to be able to log in using credentials or sign in information from another social media application, such as Facebook® or Instagram® or the like. This is advantageous for users who do not wish to have to learn or provide multiple types of login information.

Users 115*a* and 115*b* may be requested to take pictures of themselves whereby server 300 collects and stores pictures of each user in a database to display to other users, for example, through a user interface 125 or a projector of microphone 110. Pictures may be for identification purposes during navigation of a session and to enhance the authenticity of the process by ensuring that the picture is of the correct, intended user 115 when interacting with other users 115. Users 115 may couple, link, or connect with user accounts from social networking websites and internal networks. Examples of social networking websites include but are not limited to Instagram®, Facebook®, LinkedIn®, Snapchat®, and Twitter®. Server 300 may use access tokens or other methods as a parameter for searching for a friend list or address book of users 115 on a social networking site or other site. Server 300 then may use this friend list information to initialize a contact list database for users 115 stored within server 300 databases.

After registering, users 115 may invite other users or be invited by other users to connect via interactive microphone system 100. The connection may be mutual where both users 115 consent the connection. In some embodiments, the connection may be one sided where one user 115 "follows" the other user 115. which does not require the other user's 115 consent. When one user 115 has a connection with another user 115, the connected users 115 may be able to communicate with the other user 115 as well as receive the connected user's 115 messages, picture, videos, and other content in the user's personalized content feed. In some embodiments, the augmented reality networking system may automatically connect two users based on user specifications and criteria. Settings regarding communications by users 115 may be modified to enable the user to prevent the system from automatically connecting the user to another user or letting another user follow the user, or letting another user message the user, as well as other settings.

In some embodiments users 115 may invite other users to connect via a "bump" mechanism between microphones 110 so as to connect users to be friends or in some embodiments initiate a challenge. The bump may be replaced by other events, such as but not limited to a simultaneous gesture, button press, or voice command of the two microphones. A valid bump is intended by both users 115 and connects the correct users 115. Bumping may be validated to confirm valid bumps as well as preventing bumps between parties when one or both parties do not intend to bump. Validation may occur by server 300 receiving a signal from communication system 230 of two separate microphones 110 that control system 210 has detected a change in acceleration or an impact by sensor signal processing. If the status report is indicated in the positive from both microphones 110, then the location and time of both microphones 110 may be compared for determining whether or not the two microphones 110 were at the same place at the same time. If the microphones 110 are within a predetermined distance of one another at the same time and control systems 210 in microphones 110 have detected a change in acceleration or an impact by sensor signal processing, then server 300 determines a positive correlation and connects the first user 115 and the second user 115.

Users 115 may scroll through a selection of songs through user interface 125 of user computing device 120 or the hologram projector of microphone 110 whereby once selected, server 300 may retrieve data including audio file and associated metadata such as the lyrics and album cover art. Songs may have nested hyperlinks for linking and to provide additional details to learn about the songs or listen to a sample of the song.

The background music of a song may begin playing through the speaker assembly of microphone 110 or user computing device 120. Lyrics of the song may be presented on the holographic projector of microphone 110 or user computing device 120 so that users 115 may have an easier time singing along with the song without remembering the words. User interface 125 may have a recommendation system that presents music to users 115 based on but not limited to metadata such as artist, album, genre, etc., acoustic features such as beats, melody, etc., direct feedback from the users such as rating; and collaborative feedback such as information obtained from other users including purchasing patterns, listening patterns, and other patterns.

In some embodiments, microphone 110, user computing 120, or server 300 may compare the timestamps of data records associated with the pitch sample recorded while users 115 are singing. A comparison is done from a number of data records stored with different timestamps to the pitch value stored in that data record at that timestamp (i.e., correct pitch). In some embodiments, the comparison includes determining the absolute value of the difference between the correct pitch value and the sample pitch data. A performance evaluation of users 115 singing may then be generated based on the valuation of the pitch difference or error, whereby the error may be scaled based on the difficulty selected by users 115. For instance, users 115 may receive a more favorable score if the pitch differs a moderate amount on an easy setting mode and a less favorable score on a hard setting mode.

Users 115 may also perform a song with no background music or song selected during a free style mode. While singing a song through microphone 110, image or video may be captured by a camera on user computing device 120 or speaker and camera from microphone 110 whereby audio may also be taken by speaker or other audio input device located or otherwise connected to microphone 110. Interactive microphone system 100 may act and pay users 115 like they are working at a real job whereby the video and audio of users 115 singing may be recorded and compensated.

Figure 6:
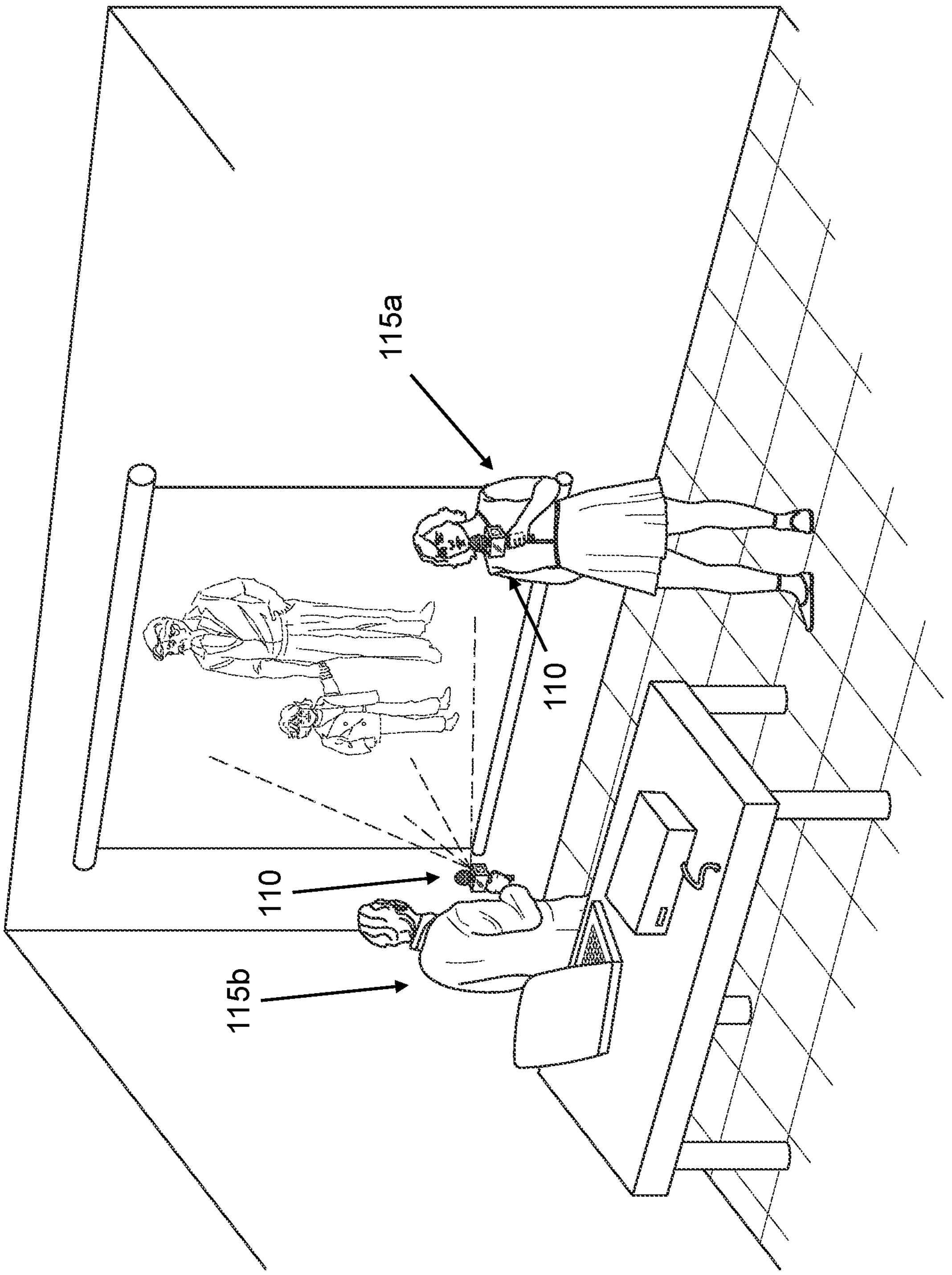
FIG. 6 shows an illustration of a performance of a user of the interactive microphone system.

Users such as 115*a* may broadcast real time streaming video whereby server 300 transmits live or archived video content over network 400 that may be accessed by other user computing devices 120 or microphones 110, as illustrated in FIG. 6. Server 300 may receive a request to share video or audio content with one or more users 115 that has been captured by the camera and or speaker of microphone 110 or user computing device 120. The request for sharing video or audio content may be received through server 300 whereby server 300 interacts with communication system 230 to provide an instance of the video or audio content in response to the request. Communication system 230, in response to the request for sharing, retrieves the video or audio content at the time the request for sharing was received. The instance of the video or audio content, based on the information retrieved, includes the current video or audio content and other attributes of the video or audio content of user 115*a* who initiated the sharing of the video or audio content. Server 300 may also store video and audio from first user 115 as well as still images form the video. Server 300 may use any number of encoders known by those of ordinary skill in the art which format the video and audio signals for streaming delivery to users 115 such as user 115*a*. In some embodiments, user 115*a* may share content over connected social media networks such as Facebook®, Twitter®, Instagram®, Mixer®, or Twitch®.

The video or audio content provided by first user 115 from a plurality of locations may be presented on user interface 125 for selection by other users such as user 115*b*. User 115*b* may search for available video or audio content based on various selection criteria such as, for example, the name of user 115 such as user 115*a*, the genre of music, the location of user 115 etc.), with or without audio, and with or without corresponding video. The search may yield results of real time streaming content that is being broadcast live by user available content, archived or previously recorded content, or content that user 115*a* will be broadcasting or a designated time for a physical location or venue.

The video or audio content found may be displayed within separate windows or frames, or as a list depending on the amount of content found matching the specific search criteria. Some video or audio content may include multiple recordings which offer additional viewing selections for one user 115 performance. For instance, if multiple users 115 are recording a performance by a single user such as user 115*a*. This is advantageous because a user 115 may watch multiple views of a single performance or event. The file of audio or video content resides and is read directly from the server 300 as it plays so there are no lengthy delays or waits for huge memory consuming files to be downloaded before playing by other users 115.

After selecting a specific video or audio content, user 115 may be coupled to the selected video or audio content whereby server 300 begins transmitting the video or audio streaming to users 115. The elapsed viewing time may be displayed for the user to see. In some embodiments interactive microphone system 100 may employ a pay-per-view system whereby users 115 purchase tokens or other form of currency, with each token representing a predetermined block of time or an amount of performances. Users 115 purchase tokens using a credit card over a secure credit card connection. The purchased tokens are credited or debited into an account a user may establish. The user may watch the selected content until the content ends, viewing time expires, or may exit at any time. The amount of revenue collected by interactive microphone system 100 may have a set distribution made to each content provider user 115, or to venue, establishment, or other business. The distribution can be a set percentage for all content provider users 115 based upon the amount of time they provided paid-for content, or the distribution can vary depending upon a scale of time. In some embodiments, user 115 may only receive payment if they acquire a certain amount of viewers or after a predesignated time.

Interactive microphone system 100 may also make payments to users 115 who are streaming or recording and submitting audio and video. Interactive microphone system 100 may provide an indication of the payment to be provided to users 115 if users 115 create or perform and record an existing song whereby interactive microphone system 100 provides payment to users 115 in response to revenue generated from a performance of users 115.

When purchasing tokens, user interface 125 may display to users 115 the order summary, the price information including subtotal, discounts and taxes, promotional coupon and gift card entry fields, gratuity or tipping field, mode of payment, and calculated total including subtotal combined with taxes, discounts, and gratuity added. Users 115 may input their credit card information for a credit card using any credit card known in the art, including, without limitation an ATM card, a VISA®, MasterCard®, Discover®, or American Express® card in a credit card input field, or can alternatively use PayPal® or the like. Users 115 may submit the payment information via an appropriate button through user interface 125 or return to an earlier step in the session.

User interface 125 may provide the ability to obtain one or more images of the credit card associated with the financial transaction. Images of the credit card may be captured by camera on user computing device 120 or camera on microphone 110 whereby interactive microphone system 100 may access the images. Images may include a front image of the credit card and back image of the credit card. Sever 300 may collect and store pictures of one or more credit cards of each user in databases for subsequent use. In some embodiments, images and the extracted details of the credit card may be deleted from the memory immediately or shortly after a transaction has been completed or terminated, while in further embodiments temporarily stored credit card data may be encrypted and compressed for added security and stored on databases for subsequent use whereby user interface 125 may allow users 115 to select from previously used credit cards.

Users 115 may be rewarded with game achievements based on mastering certain in-game facets of the performance they perform or the songs they sing. As used herein, "reward" refers to a graphical, audio, numerical, or other player notification event that occurs in relation to play accuracy detection. A reward may be a positive indicator of accurate game play such as an accrual of points or ranking, indication of advancing to a next level that may be presented to other users 115, or it may be a negative indictor of inaccurate game play such as a buzzer or other unpleasant noise.

Artists, entertainers, singers, and video recorders using interactive microphone system 100 may be able to appear at certain locations to perform or entertain whereby they will receive certain points, rewards, and trophies for participation with microphone 110. Also, other users 115 such as reporters, video recorders, and promoters may receive points for participating as well if they are checked in to a location. These locations, coined "hot zones" are designed to deliver a significant amount of business to different types of venues.

Server 300 may calculate and disburse rewards, trophies, or payments to users fulfilling requests whereby interactive microphone system 100 may provide an indication of the payment to be provided to user 115 if user 115 performs the task at the hot zone or other physical location whereby interactive microphone system 100 provides payment to user 115 in response to receiving a fulfilled request from user 115 for additional input with reference to certain locations.

Venues or other physical locations may also initially register to become a registered establishment associated with interactive microphone system 100, such that it may register to become a hot zone for users or offer revenue or rewards for users 115 performing there. Upon initially signing up with interactive microphone system 100, venues or other physical locations may be prompted to provide information along with a requested password. Information may be the hours, directions, promotional content, contact information, corporate structure, and reservations.

Interactive microphone system 100 may have a recommendation system to incentivize users 115 to refer other users 115 to physical locations or hot zones in exchange for monetary compensation from interactive microphone system 100 or hot zone while also helping the physical location, venue, or business receive users 115 by word of mouth. In one or more non limiting embodiments, users 115 may be presented with the option to refer another user 115 whereby user interface 125 may display a search window where a user such as user 115*a* may search for and select one or more second users 115 to receive a referral. In response to the referral by user 115*a*, server 300 generates a referral and notifies a user such as user 115*b* of the referral from user 115*a* and displays the request through user interface 125 to user 115*b*.

In one or more non-limiting embodiments, server 300 may transmit a commission to a referring user 115 the form of funds deposited in their interactive microphone system 100 account or other means known by those of ordinary skill in the art. In further embodiments, user interface 125 may provide an option for second client 115 to select a referring client 115 on screen or during any time.

Users 115 may check into any location such as a hot zone with microphone 110 or user computing device 120 to receive these points, rewards, and trophies. A "check in" as used herein is self-reported positioning of users 115 at a physical place and sharing of their locations with their friends or other contacts through Interactive Microphone System 100. User's 115 "check-in" may also be recorded and uploaded to databases of server 300 whereby the "check-in" may be transmitted to other user computing devices 120 where user interface 125 displays the "check in" of user 115 and recent activity of user 115 at the location. Server 300 may also store user's 115 "check-in" in databases of server 300 for subsequent use and collection of information pertaining to user 115. In some non-limiting embodiments, user's 115 "check in" is visible to user's 115 contacts and even other non-contact users depending on privacy settings, which may be set or modified by user 115 via the user interface 125.

The location may be determined directly by a variety of sensing components such as optical cameras and infrared (IR) cameras, global positioning system, compass, wireless networks, or Bluetooth. The location component may then determine location information of the user based on the received information from user computing device 120 or microphone 110. The cameras may also determine the location based on how far the body and face of users 115 are from the camera. The distance of user computing device 120 or microphone 110 from the user's 115 eyes may also be determined by control system 210 or server 300 when receiving signals from sensor signal processing on microphones 110 to calculate and adjust location information accordingly as well as adjust the avatar such that the avatar may follow or recognize what user 115 is looking at and interacting with.

In one or more non-limiting embodiments users 115 may search for locations to check in. User interface 125 may present to user 115 a search window whereby a search request having a character string may be entered where one or more locations may be identified using name, or the type of business, or other metadata pertaining to venue or other physical location Users 115 may input additional text or changes to the existing search request through user interface 125 to receive an updated list of locations based on the newly entered text. The search request may also include other parameters, such as categories, distance, and already visited locations. Further, in some embodiments, these parameters as well as others may be automatically factored in when a search request is conducted. User interface 125 may provide the ability to adjust and select parameters that may be used to filter and/or rank the results of the location displayed to the users 115.

Server 300 may send a data request to user computing device 120 or microphone 110 for identifying a geographic location of user computing device 120 or microphone 110 or a network location of user computing device 120 or microphone 110, as well as a timestamp identifying when the location was recognized. The geographic location may be any physical location, which may be expressed in longitudinal and latitudinal coordinates, and may include other dimensions and factors such as altitude or height for determining an exact position of the geographic location. Sever 300 may gather location data from a GPS system, a triangularization system, a communications network system, or any other system on user computing device 120 or microphone 110 that server 300 may determine the location of user computing device 120 or microphone 110.

Server 300 may then determine whether users 115 are within a predetermined distance of the physical location based on either the location of microphone 110 and user computing device 120 or a combination of both. Server 300 may also verify that microphone 110 and user computing device 120 are within a certain proximity of each other as well at the physical location. In a non-limiting embodiment, the distance may be 20 yards, but the distance may be greater or less depending on the location and the density of the area in which the hot zone is located. In other embodiments, a third-party location system may also be used instead of the GPS capability of the user computing device 120 or microphone 110. If user 115 is not within the predefined distance, user 115 may be notified by server 300 through user interface 125 that they may not check in until they are closer to the physical location. If the user checks in successfully, user 115 is able to check in to the location. In some embodiments, user 115 may only collect incentives and rewards within a predetermined amount of time to ensure the actual user is the one in the location. This may be calculated by users 115 holding onto microphone 110 or holding down a button 116.

Figure 7:
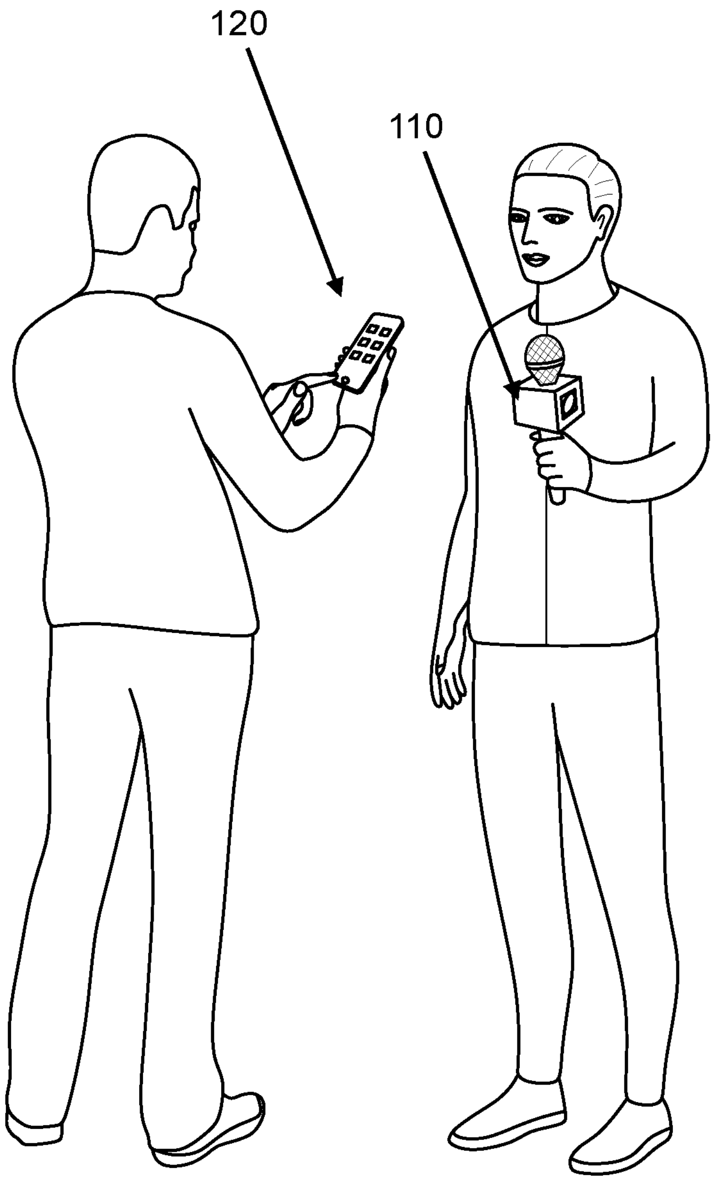
FIG. 7 shows an illustration of the method of use for the interactive microphone.

As illustrated in FIG. 7, Users 115 may compete against each other to see how long they may users 115 holding onto microphone 110 or holding down a button 116 on microphone 110 as well as holding onto user computing device 120 pressing their finger or thumb against the screen of user computing device 120 for incentives, rewards, and prizes. In this process, display 270 may be a touch panel on user computing device 120 that is touched by user whereby sensors may receive one or more signals. User computing device 120 may analyze and send these signals to server 300 or another component of interactive microphone system 100 in response to the location of user computing device 120 and if and how long user is holding onto the touch panel. In a similar approach, control system 210 of microphone 110 may receive a signal from the various sensors whereby communication system 230 may send a signal to server 300 of the location of microphone 110 and if and how long user is holding onto microphone 110.

In some embodiments, it may be determined if microphone 110 or user computing device 120 (from GPS, Wi-Fi, etc.) is within a predetermined distance from a physical location wherein incentives, rewards, and prizes are given if users 115 makes it to the physical location while holding microphone 110 or button 116 on microphone 110 as well as holding onto user computing device 120 pressing their finger or thumb against the screen of user computing device 120. In further embodiments, users 115 may have to stay within a predetermined area while holding microphone 110 or button 116 on microphone 110 as well as holding onto user computing device 120 pressing their finger or thumb against the screen of user computing device 120 to receive incentives, rewards, and prizes. When only one user 115 or a set of users 115 remains, prizes may be allocated or user computing devices 120 or microphone 100 may be granted access or privileges on a specific platform.

In some embodiments, server 300 may receive numerous "check in" and associated data over network 400 initiated by users 115 through user interface 125. These "check ins" may be stored in one or more databases on server 300, which may be shared with other images, or stored in a separate location. User interface 125 may display a list of contacts including user 115 that have "checked in" to a venue or other physical location. The contacts may be displayed on a generated map through user interface 125. The map may be displayed to user 115 with the other users 115 displayed as markers, pins, or identifiers at their respective locations in the real world. Maps may also include graphical representations of establishments, businesses, venues, locations, monuments, buildings, streets, lakes, and other landmarks.

Maps may also display current location of user computing devices 120, as determined by the location gathered by server 300 and stored in databases of server 300 whereby the current location is identified on a map by a graphical item. Graphical item signifying the current location of user computing device 120 or microphone 110 may be a square, triangle, a human-shaped icon or avatar of user 115, a text representation, a picture or photo, or any other graphical item used by those of ordinary skill in the art. Utilizing the tags, comments, ratings, and other information stored on databases of server 300, server 300 may determine the level of locations based on the amount of "check in" of least one zone and can provide an indication of the activity or density of the level at the location on user interface 125.

Hot zones or zones may also be displayed through user interface 125 on a map to user 115. These Hot Zones may be displayed as a graphical item such as an icon, a picture, a text representation, a drawing, an image, a symbol, or any other graphical item that is representative of one or more zones. Zones may be displayed relative to the current location of user computing devices 120.

A graphical indication of the zones as well as density and activity levels associated with the zones may be displayed through user interface 125 whereby users 115 may review information related to current happenings within the vicinity of the user computing devices 120. Additionally, information relating to the zone and any current event, such as a scavenger hunt or obstacle course, occurring within the vicinity surrounding or associated with the current position of user computing devices 120 may be readily available without the use of an external search engine. User interface 125 may provide users 115 the ability to view daily, weekly, monthly, yearly, and seasonal reports breaking down the statistics of sightings and their correlation to specific hot zones or other physical locations based on uploaded images and associated data stored on databases server 300.

Hot Zones may be displayed at different sizes to indicate the number of users 115 of a certain attribute or type associated or how many recent sightings of users 115 are within the zone. For example, the larger in size the graphical item is compared to other graphical items representing another zone, the more users 115 of a certain attribute or type that have been found at the location identified by the graphical item. The number of users 115 associated with the hot zone may also be represented by varying the colors of the graphical items representing the zones. For example, a graphical item that is red may represent a low number of users 115, while a graphical item of green represents a large amount of users 115 within a zone.

Details regarding special events and hot zones taking place at a physical location or venue may be specified by authorized personnel. Similarly, special events and hot zones from some or all connected physical locations or venues in interactive microphone system 100 may be listed on a calendar through user interface 125.

Sever 300 may retrieve hot zone data associated with selected locations in a geographic region selected by user 115 whereby server 300 may apply this data to a calendar template to provide a viewable calendar for users 115 to select a specific date on the calendar and view hot zone times for locations in the geographic area. Server 300 then may retrieve location data associated with the selected location whereby server 300 may apply this data to display to user 115 a list of hot zones and possible duration in the geographic area. In some embodiments, only those locations that user 115 has subscribed to or otherwise expressed interest in may be displayed on the calendar.

In some embodiments, server 300 may generate synchronization messages, such as an email message, text message, or calendar invitation for each user 115 related to the hot zones or special events causing the hot zones or special events to be included in a local personal information manager application connected to interactive microphone system 100, such as Microsoft Outlook and Google Calendar. In one implementation, the synchronization message may include a calendar data exchange file, such as an iCalendar (.ics) file in compliance with IETF RFC 5545.

Interactive microphone system 100 may utilize many different advertising techniques by registered location, venue, or business users 115 as well as any users 115 who are goods or service providers. When a user 115 is within a predetermined distance of a venue or physical location, an automated advertisement procedure may be initiated for presentation on user interface 125 to users 115. Advertisements may be in the form of offers such as discounts, or other incentives presented to users 115 through user interface 125. In one or more non-limiting embodiments, metrics may be utilized by server 300 to only present advertisements to users 115 such as but not limited to users 115 who have not visited the venue or physical location before (a user with zero "check-ins") or users 115 of a certain demographic such as age, profession, or ranking.

In some embodiments, server 300 may analyze and calculate data stored in the databases whereby user interface 125 may display collected results from server 300 in the form of ranking leaderboards among the users 115 based on any number of parameters, including most performances in the month, most performances at a hot zone, most performances of the same song, whereby hot zones may further incentivize users 115 on the leaderboards with advertisements, promotions, or notifications directed to attracting other users 115.

Users 115 may also challenge or dare each other in a performance battle whereby users 115 may be evaluated in a similar manner to when user 115 performs solo. Other users 115 may also be displayed on user interface 125 as a list or a drop-down menu. The list may display all contacts of users 115 and show users 115 in different ways that may be differentiated by numerous parameters, such as users 115 who are "checked in" to locations, users 115 who are currently in a challenge, and users 115 who are idle. If desired, users 115 such as user 115*a* may select another user 115 such as user 115*b* that has "checked in" to a venue or other physical location. User interface 125 may provide additional information to user 115 such as if they had challenged user 115*b* before and how many times they challenged user 115*b* as well as how many times they selected a song in the past and if so, be how many times they played the song.

In some embodiments, user 115*a* may select multiple contacts that have "checked in" to the same venue or physical location. Maps may also display current location of user computing devices 120, as determined by the location gathered by server 300 and stored in databases of server 300 whereby the current location is identified on a map by a graphical item. In other embodiments, challenges may be placed in a request queue and users 115 that are placed in the queue may be provided the opportunity to sing a song once user 115 has reached the front of the request queue.

User 115*b* may receive a notification that a "challenge" to perform one or more songs has been initiated by user 115*a* whereby user 115*b* may decide whether to accept or reject the challenge by confirmation through user interface 125. If a challenge is accepted, user 115*a* and user 11*b* may be presented a series of settings such as how many songs will be performed and the difficulty level for each user 115 such as if they need a handicap. User interface 125 then may present a song selection menu whereby when users 115 select one or more songs the songs may be added to the song selection queue. If a challenge is declined, the session may be terminated and user 115*a* may be notified of the rejection. Though a one on one duel is the example being illustrated, interactive microphone system 100 may provide challenges for multiple users 115 whereby users 115 may be divided into teams of two or three to play other teams of two or three whereby scores of all teammates are averaged or combined to determine a winner.

Users 115 may also initiate a challenge scanning an optical bar code, a QR code, a RFID tag, or other suitable identification technology displayed on user interface 125, which can automatically initiate a challenge. This may be achieved using an optical bar code, a QR code, or a RFID tag reader connected to establishment-user computing device 120 or other device. In other embodiments, users 115 may be given a code sequence that when inputted connects users 115.

Users 115 may add song selections to their previous selections or return to a previous menu to continue to search for other songs. If users 115 chooses to select a particular set of songs, users 115 may be returned to the menu to continue the process of selecting other song selections. Once one or more song selections have been chosen, the selections are placed in a queue list. As selections are added to the order list, a play list may be generated.

Server 300 may then store information pertaining to the challenge including information pertaining to the challenger and challenged along with the songs selected and playlist generated. User 115*a* and 115*b* may then perform the songs in the song selection queue of the generated playlist, possibly earning promotions or earning a token or credit for each person checked-in at the physical place, and progress of the challenge may be stored on the database of server 300. Once finished, the scores of users 115*a* and 115*b* may be calculated and a winner determined. The challenge may be marked as complete, whereby user 115*a* and 115*b* may be notified that the challenge has been completed.

User interface 125 may provide users 115 with the ability to set privacy parameters so that user's 115 presence at a particular venue or other physical location may not be visible to other users 115, but rather is only visible with a predefined group of users 115, such as only to friends or contacts of user 115 through interactive microphone system 100. Interactive microphone system 100 may include feedback provided by other users 115 to help others learn about a particular user 115. For example, if the user uses foul language or aggressive play in a challenge or was quite pleasant, other users 115 may submit feedback through user interface 125. The feedback mechanism improves the user experience by building reputations. Feedback may be anonymous but also not distinguished from one another because the user profile page may only show the accumulated feedback of users 115.

After completing a challenge, user interface 125 may display a survey to users 115 whereby the survey may display via email, text message or a link to a website asking about the other users 115 as well as the venue or physical location. Users 115 may give a rating of the selection according to any number of ranges including friendliness, skill level, visual appeal, and enjoyment. There many also may be one or more fields allowing users 115 to optionally input their own worded comments. The survey results may be made private, public, or accessible based on the privacy settings of user 115. User interface 125 may include a history button for displaying previously challenged users 115 and hot zones or venues performed.

Interactive microphone system 100 may coordinate an interactive performance event or experience allowing other users 115 to participate by acting as judges and/or audience members. Audience members listen to other users 115 during a challenge or performance singing songs. In some embodiments, song lyrics and/or additional audio or video content, such as background music, may also be broadcast to each participating user 115. In some embodiments, a hot zone may publish an invitation to join an interactive event that is presented through user interface 125 to other users. Interactive event may be a scheduled event and the plurality of users 115 may join the scheduled event by accepting a request the event published.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An interactive system, comprising:

a computing device comprising:

a non-transitory computer-readable medium comprising code associated with instructions for operation of the computing device; and a processor in communication with the non-transitory commuter-readable medium so as to receive and execute the instructions of the non-transitory computer-readable medium; and a sensor in communication with the processor, wherein the instructions are sent to the processor and the instructions are executed by the processor based on signals received by the processor from the sensor;

wherein the instructions ere executed by the processor to further perform:

determining from the sensor a duration that the computing device is being held by a user, or a duration a button or screen on the computing device is being held by the user; and determining a reward or prize based on the duration.

2. The interactive system of claim 1, wherein the instructions are executed by the processor to further perform: determining from GPS of the computing device if the computing device is within a predetermined distance from a physical location wherein the reward or prize is given if the computing device is held or the button or the screen is held by the user until reaching the predetermined distance from the physical location.

3. The interactive system of claim 1, wherein the computing device is a microphone device, the microphone device comprising a handle, a body attached to the handle, and a head attached to the body, the microphone device comprising a speaker and a microphone.

4. The interactive system of claim 3, wherein the instructions are executed by the processor to further perform: determining if the computing device is within a predetermined distance of a physical location.

5. The interactive system of claim 4, wherein the instructions are executed by the processor to further perform:

receiving audio and video transmitted from the computing device from the speaker and the microphone by a first user during a performance;

presenting audio and video from the first user to a second computing device of a second user; and transmitting payment to an account of the first user for transmitting the audio and the video from the computing device.

6. The interactive system of claim 5, wherein the instructions are executed by the processor to further perform: receiving one or more tokens for a predetermined block of time or an amount of the performance from the first user on the computing device.

7. The interactive system of claim 6, wherein the instructions are executed by the processor to further perform:

receiving audio and video transmitted from the second computing device of a performance of the first user; and presenting the audio and the video of the performance of the first user received by the computing device and the second computing device to the second computing device to offer additional viewing selections for the performance of the first user.

8. The interactive system of claim 3, wherein the instructions are executed by the processor to further perform: connecting a first user and a second user by a validation of the computing device and a second computing device by detecting a change in acceleration or an impact by sensor signal processing of the computing device and the second computing device at an identical time and an identical location.

9. The interactive system of claim 8, wherein when the first user is connected to the second user, a challenge is initiated between the first user and the second user.

10. The interactive system of claim 9, wherein the instructions are executed by the processor to further perform: evaluating during a challenge pitch difference or error of received audio interpretation of a selected song through the microphone of the computing device and a microphone of the second computing devices in comparison to stored audio of the selected song on one or more databases, wherein the error is configured to be scaled based on a difficulty selected by the first user and the second user.

11. The interactive system of claim 10, wherein the instructions are executed by the processor to further perform: presenting to the first user scores as judged by the second user who have been presented received audio interpretation of the selected song from the first user, the second user acting as judge or an audience member.

12. The interactive system of claim 11, wherein the instructions are executed by the processor to further perform: transmitting background music of the selected song through the speaker on the microphone device.

13. The interactive system of claim 12, wherein the instructions are executed by the processor to further perform: displaying lyrics from the selected song from a hologram on the computing device.

14. The interactive system of claim 13, wherein the computing device comprises a vibration motor installed wherein the vibration motor vibrates in response to a pitch difference or error.

15. The interactive system of claim 1, further comprising smart eyeglasses configured to display virtual objects associated with a challenge and lyrics of a selected song.

16. The interactive systems of claim 4, wherein the instructions are executed by the processor to further perform:

associating a physical location as a hot zone;

presenting a graphical indication of the hot zone on a user interface of a second computing device, wherein the hot zone is displayed at different sizes to indicate a total number of the computing device, the second computing device, and any other computing devices currently located at the hot zone.

17. The interactive system of claim 16, wherein the instructions are executed by the processor to further perform: presenting to a first user through a user interface of the second computing device and a second user of the second computing device that is located at the hot zone.

18. The interactive system of claim 17, wherein the instructions are executed by the processor to further perform: setting privacy parameters for the first user so that the first user's presence at the hot zone is only visible with the second user.

19. The interactive system of claim 18, wherein the instructions are executed by the processor to further perform: verifying that the computing device and one or more additional computing devices associated with the first user are within a certain proximity of each other as well as the physical location.

* * * * *